United States Patent [19]
Miller

[11] Patent Number: 5,267,752
[45] Date of Patent: Dec. 7, 1993

[54] VEHICULAR WHEEL WELL REPLACEMENT SHELL

[76] Inventor: Charles S. Miller, 2463 Holl Rd., Leslie, Mich. 49251

[21] Appl. No.: 921,621

[22] Filed: Jul. 30, 1992

[51] Int. Cl.$^5$ .............................................. B62B 9/14
[52] U.S. Cl. ..................................... 280/848; 296/198
[58] Field of Search ............... 280/847, 848, 849, 850, 280/851; 296/198; 181/198, 205

[56] References Cited

U.S. PATENT DOCUMENTS

| | | | |
|---|---|---|---|
| 2,254,497 | 9/1941 | Schafer | 296/198 |
| 3,086,794 | 4/1963 | Garrett | 280/847 |
| 3,237,963 | 3/1966 | Menzer | 280/848 |
| 3,784,226 | 1/1974 | Wilfert et al. | 280/849 |
| 4,378,120 | 3/1983 | Laine | 280/848 |
| 4,447,067 | 5/1984 | Yamashita | 280/848 |
| 4,735,427 | 4/1988 | Fuchs | 296/198 |
| 5,000,483 | 3/1991 | Blumel et al. | 296/198 |

FOREIGN PATENT DOCUMENTS 2076762 12/1981 United Kingdom ............... 296/198

*Primary Examiner*—David M. Mitchell
*Assistant Examiner*—Stephen P. Avila
*Attorney, Agent, or Firm*—Leon Gilden

[57] ABSTRACT

A polymeric liner is arranged for replacement into a wheel well portion of a vehicle for replacement of an original shell lost due to damage and rust. The unitary shell construction permits ease of mounting of the shell structure within an associated vehicle, with the shell having an outer wall formed in a spaced parallel relationship relative to an inner wall, and the outer wall including an outer wall semi-circular recess having a flange orthogonally mounted to the outer wall projecting exteriorly of the shell for ease of mounting to an existing vehicle. The inner wall includes an inner wall recess for accommodating suspension components of an associated vehicle.

3 Claims, 4 Drawing Sheets

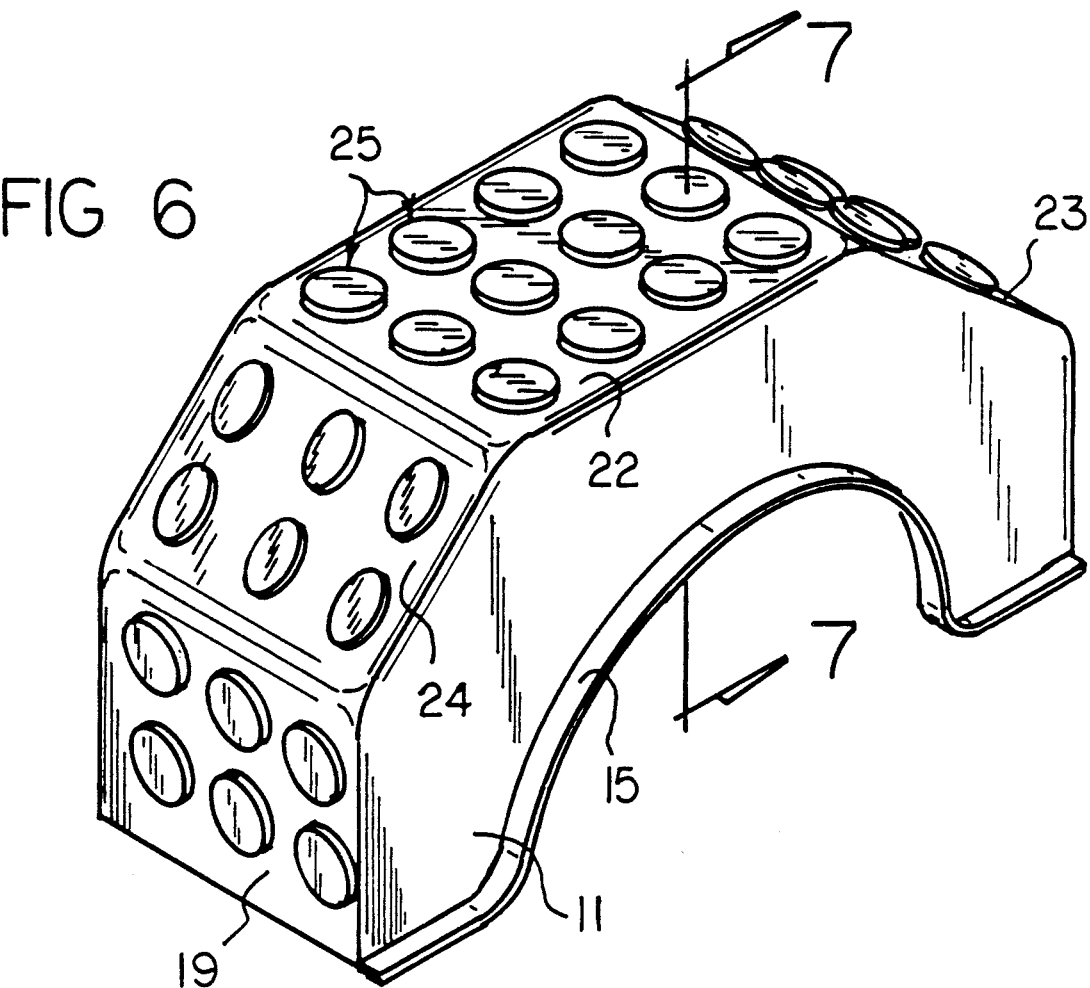
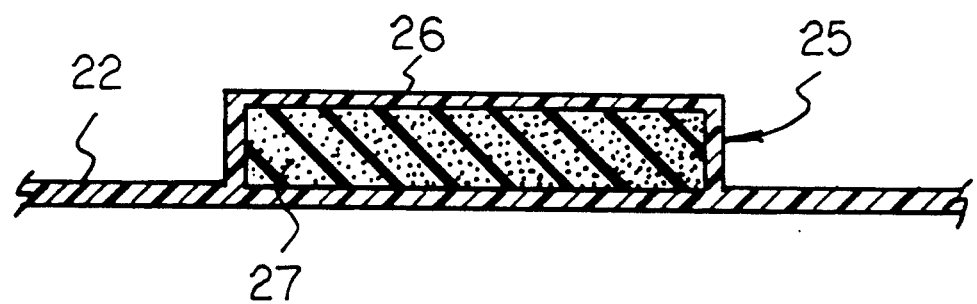

VEHICULAR WHEEL WELL REPLACEMENT SHELL

BACKGROUND OF THE INVENTION

1. Field of the Invention

The field of invention relates to vehicular wheel well construction, and more particularly pertains to a new and improved vehicular wheel well replacement shell for replacement of damage original equipment wheel wells of an associated vehicle.

2. Description of the Prior Art

Many geographical regions are subject to chemical interaction of a wheel well due to the salts utilized in snow and ice control in such regions. Further, wheel wells are damaged due to impact and the like. The instant invention attempts to overcome deficiencies of the prior art by providing for a shell structure of unitary construction formed of a polymeric material for replacement of original equipment shells having been damaged due to chemical and impact occurrence. Prior art wheel well fillers of various types are utilized and exemplified by U.S. Pat. Nos. 4,076,067 and 4,374,535 of a generally trim like construction, as is further exemplified by the U.S. Pat. No. 4,138,129 to Morris wherein a wheel well skirt is fastened to a peripheral lower edge of a wheel well.

Accordingly, it may be appreciated there continues to be a need for a new and improved vehicular wheel well replacement shell as set forth by the instant invention which addresses the problems of ease of use as well as effectiveness in construction in replacement of vehicular wheel wells and in this respect, the present invention substantially fulfills this need.

SUMMARY OF THE INVENTION

In view of the foregoing disadvantages inherent in the known types of wheel well construction now present in the prior art, the present invention provides a vehicular wheel well replacement shell wherein the same is arranged for replacement of a damaged wheel well of an associated vehicle. As such, the general purpose of the present invention, which will be described subsequently in greater detail, is to provide a new and improved vehicular wheel well replacement shell which has all the advantages of the prior art vehicular wheel well construction and none of the disadvantages.

To attain this, the present invention provides a polymeric liner arranged for replacement into a wheel well portion of a vehicle for replacement of an original shell lost due to damage and rust. The unitary shell construction permits ease of mounting of the shell structure within an associated vehicle, with the shell having an outer wall formed in a spaced parallel relationship relative to an inner wall, and the outer wall including an outer wall semi-circular recess having a flange orthogonally mounted to the outer wall projecting exteriorly of the shell for ease of mounting to an existing vehicle. The inner wall includes an inner wall recess for accommodating suspension components of an associated vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, method and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular wheel well replacement shell which has all the advantages of the prior art vehicular wheel well construction and none of the disadvantages.

It is another object of the present invention to provide a new and improved vehicular wheel well replacement shell which may be easily and efficiently manufactured and marketed.

It is a further object of the present invention to provide a new and improved vehicular wheel well replacement shell which is of a durable and reliable construction.

An even further object of the present invention is to provide a new and improved vehicular wheel well replacement shell which is susceptible of a low cost of manufacture with regard to both materials and labor, and which accordingly is then susceptible of low prices of sale to the consuming public, thereby making such vehicular wheel well replacement shells economically available to the buying public.

Still yet another object of the present invention is to provide a new and improved vehicular wheel well replacement shell which provides in the apparatuses and methods of the prior art some of the advantages thereof, while sumultaneously overcoming some of the disadvantages normally associated therewith.

These together with other objects of the invention, aloing with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of a modified aspect of the invention.

FIG. 7 is an orthographic view, taken along the lines 7—7 of FIG. 6 in the direction indicated by the arrows.

DESCRIPTION OF THE PREFERRED EMBODIMENT

Figure 1:
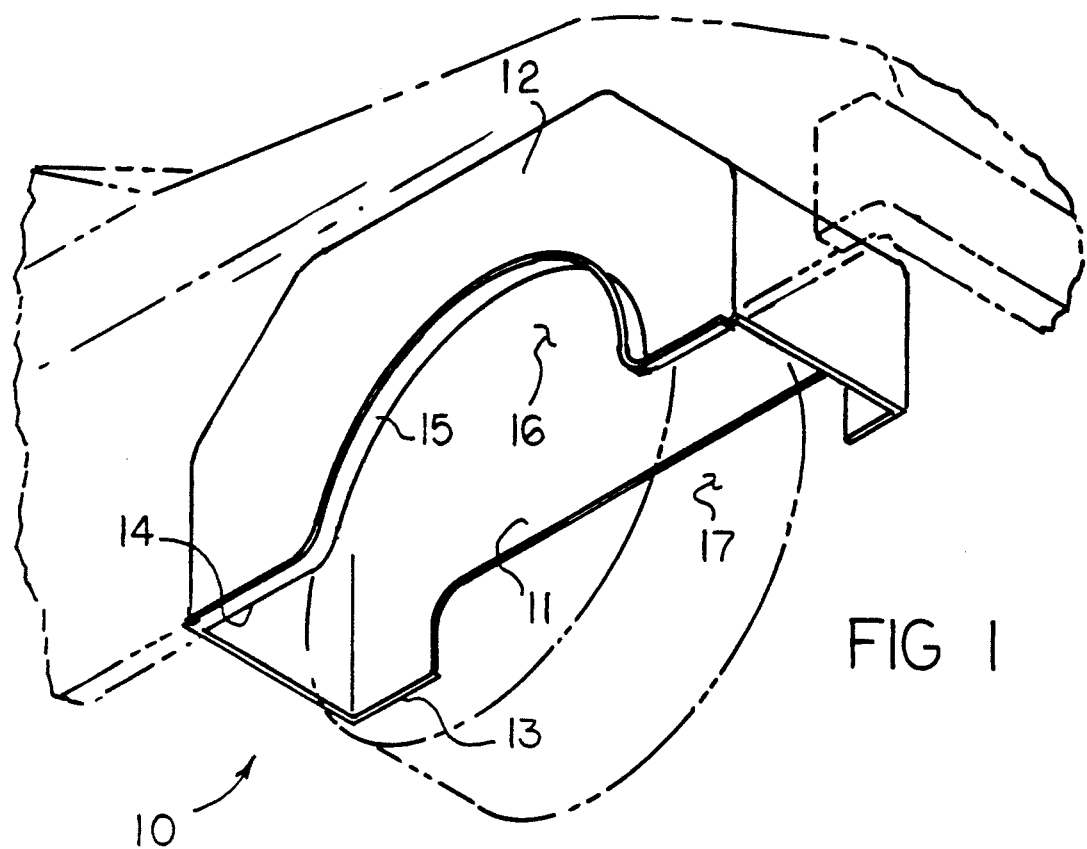
FIG. 1 is an isometric illustration of the instant invention.
Figure 2:
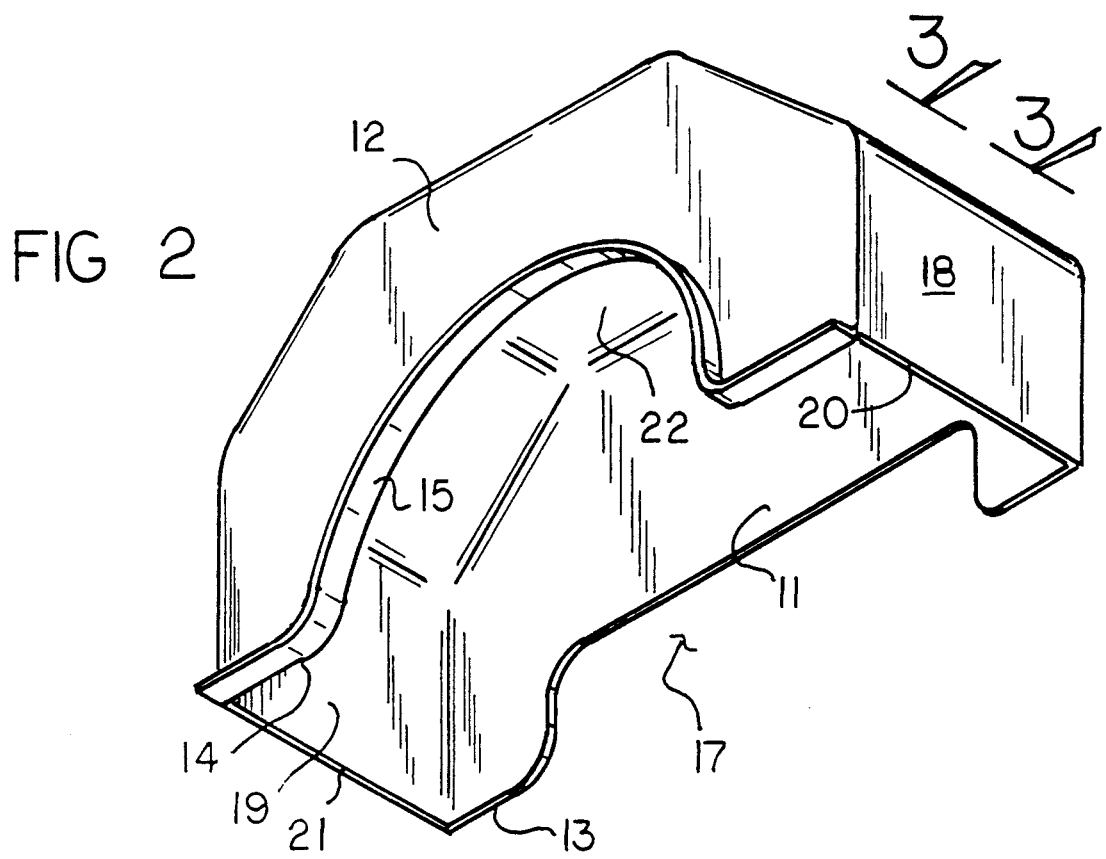
FIG. 2 is an enlargement isometric illustration of the invention.
Figure 3:
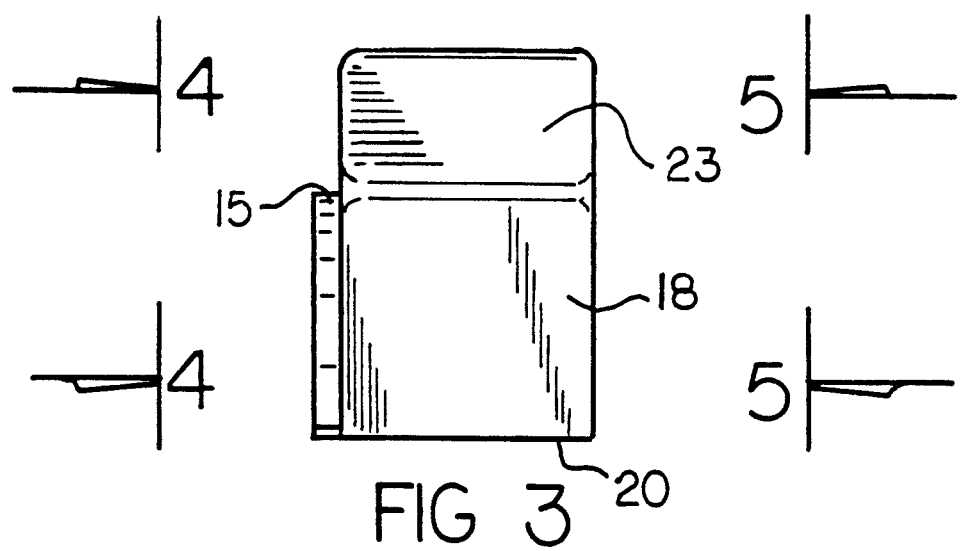
FIG. 3 is an orthographic view, taken along the lines 3—3 of FIG. 2 in the direction indicated by the arrows.
Figure 4:
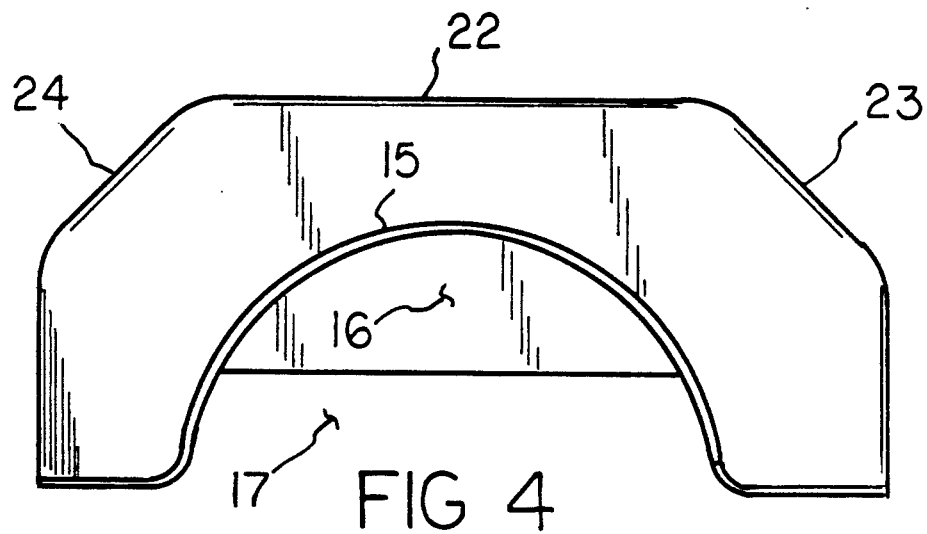
FIG. 4 is an orthographic view, taken along the lines 4—4 of FIG. 3 in the direction indicated by the arrows.
Figure 5:
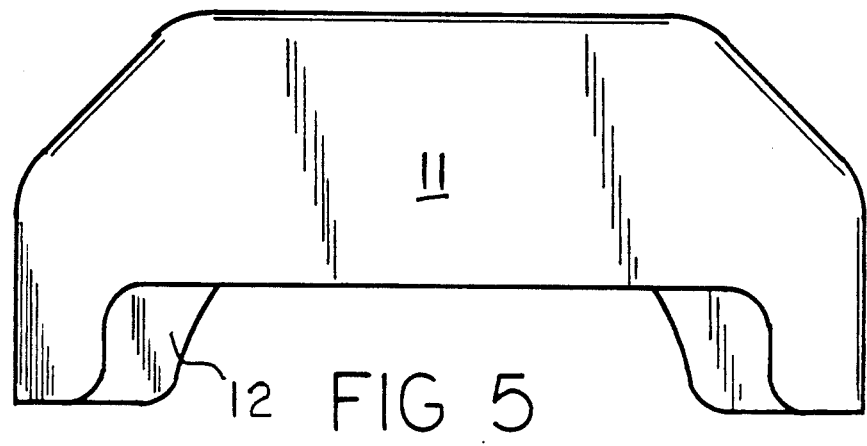
FIG. 5 is an orthographic view of the shell structure, taken along the lines 5—5 if FIG. 3 in the direction indicated by the arrows.

With reference now to the drawings, and in particular to FIGS. 1 to 9 thereof, a new and improved vehicular wheel well replacement shell embodying the principles and concepts of the present invention and generally designated by the reference numeral 10 will be described.

More specifically, the vehicular wheel well replacement shell 10 is formed of a unitary polymeric construction, having a configuration to be complementarily positioned within a vehicular wheel well, as illustrated in FIG. 1, and mounted to whatever remaining components of the original wheel well permit securement of the replacement shell structure 10. To this end, various fasteners and adhesives as are commercially available may be utilized for the assembly of the replacement shell structure 10 to a remaining vehicular wheel well.

The shell structure 10 includes an inner wall 11 spaced from and parallel an outer wall 12, each of a predetermined length. The inner wall 11 includes an inner wall lower edge 13, the outer wall 12 including an outer wall lower edge 14, with the outer edge 14 having a mounting flange 15 arranged coextensively relative to the outer edge orthogonally oriented relative to the outer wall 12 for mounting to the existing vehicular body panels. The outer wall 12 further includes an outer wall semi-circular recess 16 for accommodating a vehicle's body lines and associated sheet metal, wherein the inner wall 11 includes an inner wall elongate recess 17 for accommodating various components relative to the associated vehicle. The height of the recess 17 is substantially less than that of the semi-circular recess 16. A front wall 18 is spaced from and parallel a rear wall 19, with the front wall 18 and the rear wall 19 having respective front and rear lower edges 20 and 21 that are coplanar relative to the inner and outer wall lower edges 13 and 14. A top wall 22 is provided, including a top wall forward section 23 directed and canted downwardly relative to the front wall 18, with a top wall rear section 24 canted downwardly towards the rear wall 19. The unitary polymeric construction of the invention is arranged for ease of mounting relative to an existing vehicular wheel well configuration, with the polymeric construction further permitting flexure to accommodate variations within wheel well construction to thereby accommodate a range of vehicles.

The FIGS. 6 and 7 illustrate the use of a matrix of sound muffling pads 25 mounted coextensively relative to the top wall 22 and the associated forward and rear sections 23 and 24 respectively. Each of the muffling pads 25 is formed of a resilient outer casing 26 having polymeric foam insert 27 coextensively within and between the casing 26 and an exterior surface of the top wall structure. In this manner, mounting to an existing vehicle minimizes vibration and associated noise further expediting ease and rapidity of mounting of the shell structure relative to the existing vehicle.

Figure 8:
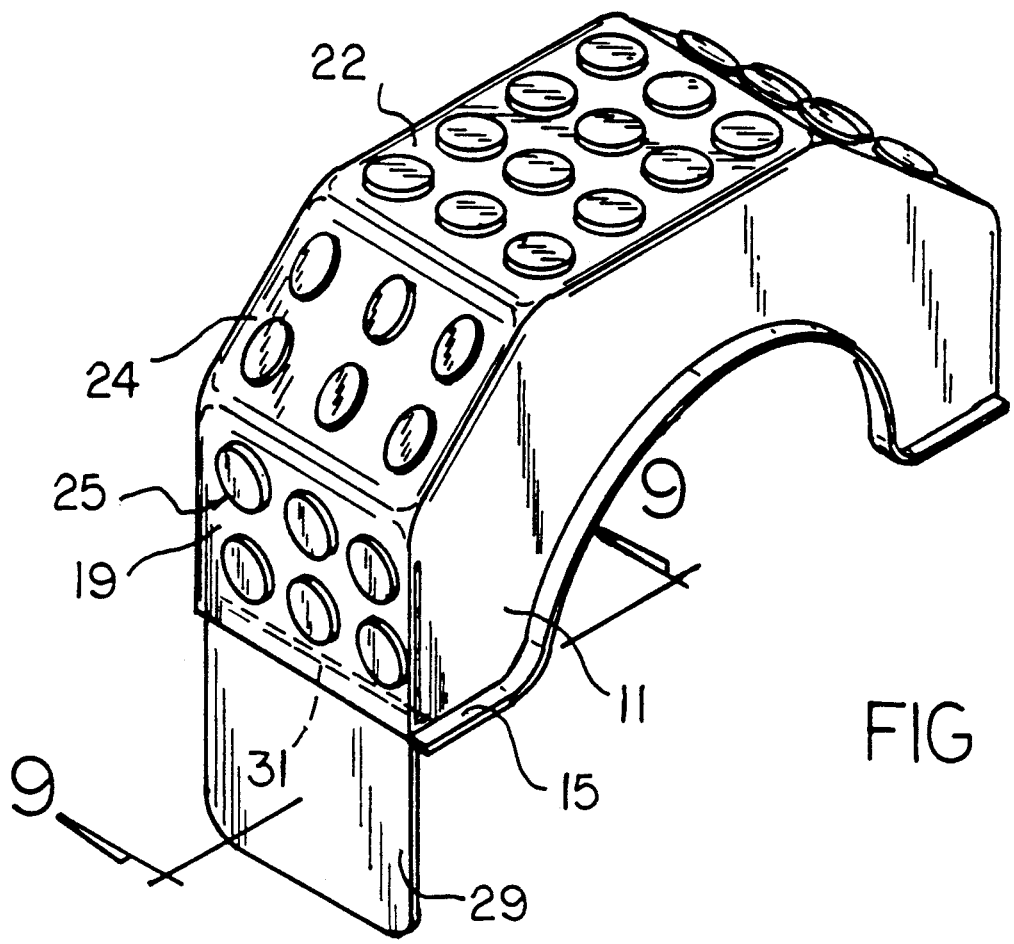
FIG. 8 is an isometric illustration of a further aspect of the invention.
Figure 9:
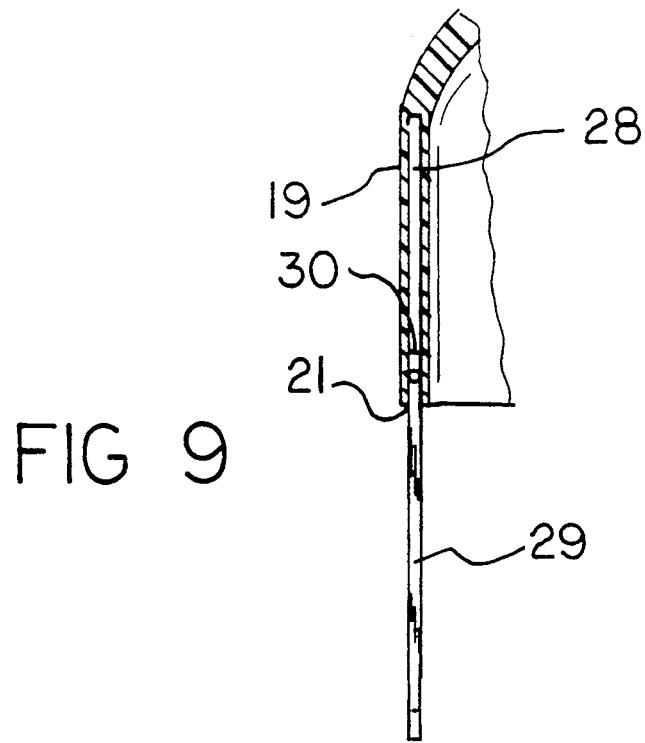
FIG. 9 is an orthographic view, taken along the lines 9—9 of FIG. 8 in the direction indicated by the arrows.

The FIG. 8 is arranged to further include a rear wall slot 28 that is directed into the rear wall parallel to the front wall and extends through the rear wall lower edge 21. A resilient mud flap 29 is directed into the slot 28 from the lower edge extending therebelow, with the resilient mud flap 29 arranged for vertical adjustment relative to the lower edge 21, and upon such positioning, a fastening rod 31 is directed through the mud flap 29 parallel to the lower edge 21 adjacent the mud flap upper end 30, whereupon projection of the fastening rod 31 into the mud flap effects expansion of the resilient mud flap 29 for engagement and securement within the slot 28, wherein such adjustment is effected prior to assembly of the shell structure 10 relative to an associated vehicle accommodating the replacement shell structure of the invention.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only to the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the Unites States is as follows:

1. A vehicular wheel replacement shell, comprising,
an inner wall spaced from and parallel an outer wall, with the inner wall and the outer wall each of a predetermined length, the inner wall having an inner wall lower edge, the outer wall having an outer wall lower edge, and
a front wall spaced from and parallel a rear wall, the front wall having a front wall lower edge, and the rear wall having a rear wall lower edge, wherein the rear wall lower edge, the front wall lower edge, the outer wall lower edge, and the inner wall lower edge are coplanar, and the inner wall including an inner wall elongate recess extending into the inner wall from the inner wall lower edge defined by a predetermined height, and the outer wall having an outer wall semi-circular recess defined by a predetermined radius greater than the predetermined height, and the outer wall lower edge includes an outer wall mounting flange coextensive with the outer wall lower edge coextensive therewith extending continuously about the semi-circular recess projecting exteriorly of the outer wall for mounting to an associated vehicle, and the replacement shell includes a top wall, with the top wall having a top wall forward section canted downwardly relative to the front wall, and a top wall rear section canted downwardly relative to the rear wall, and a matrix of sound muffling pads mounted coextensively to the top wall, the top wall forward section, the top wall rear section.

2. A replacement shell as set forth in claim 1 wherein each of the muffling pads includes a resilient outer casing, the resilient outer casing includes a polymeric foam insert coextensively directed throughout the casing.

3. A replacement shell as set forth in claim 2 wherein the real wall includes a rear wall slot, with the rear wall slot parallel relative to the front wall and directed through the rear wall lower edge, and a resilient mud flap member mounted within the slot directed below the rear wall lower edge, and the mud flap having a mud flap upper edge, and a fastening rod oriented parallel relative to the rear wall lower edge directed into the mud flap parallel to the mud flap upper edge and the rear wall lower edge for expansion of the mud flap and engagement of the mud flap within the slot.

* * * * *